United States Patent
Kovach et al.

(10) Patent No.: US 11,125,164 B2
(45) Date of Patent: Sep. 21, 2021

(54) BAFFLE WITH TWO DATUM FEATURES

(71) Applicant: United Technologies Corporation, Farmington, CT (US)

(72) Inventors: Scott A. Kovach, Higganum, CT (US); Tracy A. Propheter-Hinckley, Rocky Hill, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 105 days.

(21) Appl. No.: 16/527,422

(22) Filed: Jul. 31, 2019

(65) Prior Publication Data

US 2021/0033027 A1 Feb. 4, 2021

(51) Int. Cl.
*F02C 7/18* (2006.01)
*F01D 5/18* (2006.01)
*F01D 9/04* (2006.01)
*B23Q 3/06* (2006.01)

(52) U.S. Cl.
CPC ............... *F02C 7/18* (2013.01); *F01D 5/188* (2013.01); *F01D 5/189* (2013.01); *F01D 9/041* (2013.01); *B23Q 3/063* (2013.01); *F05D 2230/10* (2013.01)

(58) Field of Classification Search
CPC .......... F01D 5/188; F01D 5/189; F01D 9/041; F05D 2230/10; F02C 7/18; B23Q 3/063
See application file for complete search history.

(56) References Cited

U.S. PATENT DOCUMENTS

| 6,186,867 | B1* | 2/2001 | Dwyer .................. B23Q 3/063 269/296 |
| 8,142,137 | B2 | 3/2012 | Johnston et al. |
| 9,687,926 | B2 | 6/2017 | Mercier et al. |
| 2005/0135923 | A1* | 6/2005 | Coons ..................... F01D 9/041 415/115 |
| 2018/0371920 | A1 | 12/2018 | Packer et al. |
| 2019/0391559 | A1* | 12/2019 | Auxier ............... G05B 19/4097 |

FOREIGN PATENT DOCUMENTS

| EP | 1544414 | 6/2005 |
| EP | 2246139 | 11/2010 |
| EP | 3421722 | 1/2019 |
| FR | 2094033 | 2/1972 |

OTHER PUBLICATIONS

European Search Report for European Patent Application No. 20187671.1 dated Sep. 30, 2020.

* cited by examiner

*Primary Examiner* — Matthew W Jellett
(74) *Attorney, Agent, or Firm* — Carlson, Gaskey & Olds, P.C.

(57) ABSTRACT

A method of fabricating a baffle for a gas turbine engine component includes providing a baffle that has a baffle wall that circumscribes an open interior region, the baffle wall defining two datum features, wherein at least one of the two datum features is semi-spherical, establishing a fixed reference position of the baffle in a fixture by engaging the two datum features with two corresponding locators on the fixture, and performing at least one operation on the baffle that is dependent upon the reference position.

15 Claims, 4 Drawing Sheets

BAFFLE WITH TWO DATUM FEATURES

BACKGROUND

Baffles are known and used in cooled gas turbine engine airfoils, such as turbine vanes. Typically, a baffle is situated in a cavity in the airfoil and serves to distribute cooling air to precise locations in the airfoil.

SUMMARY

A method of fabricating a baffle for a gas turbine engine component according to an example of the present disclosure includes providing a baffle that has a baffle wall that circumscribes an open interior region. The baffle wall defines two datum features. At least one of the two datum features is semi-spherical. A fixed reference position of the baffle is established in a fixture by engaging the two datum features with two corresponding locators on the fixture. At least one operation is performed on the baffle that is dependent upon the reference position.

In a further embodiment of any of the foregoing embodiments, each of the two datum points are semi-spherical.

In a further embodiment of any of the foregoing embodiments, the two datum features are semi-spherical dimples.

In a further embodiment of any of the foregoing embodiments, the at least one operation includes a forming operation.

In a further embodiment of any of the foregoing embodiments, the at least one operation includes an inspection operation.

In a further embodiment of any of the foregoing embodiments, the at least one operation includes a cutting operation.

In a further embodiment of any of the foregoing embodiments, the at least one operation includes a drilling operation.

In a further embodiment of any of the foregoing embodiments, the baffle includes a non-working surface and the two datum features are in the non-working surface.

In a further embodiment of any of the foregoing embodiments, the baffle is elongated along a longitudinal direction, and the two datum features are spaced-apart in the longitudinal direction and in the same surface.

A method of fabricating a baffle for a gas turbine engine component according to an example of the present disclosure includes providing a baffle that initially is a tube that has two datum features that are semi-spherical dimples, nesting the tube in a fixed reference position in a fixture by engaging the two datum features with two corresponding locators on the fixture such that in the fixed reference position the tube is fixed (i) in a reference plane that is defined by first and second datum points at the two datum features and a third datum point on the tube, (ii) on a reference line that is defined between the first and second datum points, and (iii) at a reference point that is defined by one of the first or second datum points, and performing a cutting operation at a location on the tube that is dependent upon the fixed reference position. The cutting operation removes an end of the tube and creates a free surface. A drilling operation is performed at multiple locations on the tube that are dependent on the fixed reference position. The drilling operation creates a plurality of impingement orifices.

A further embodiment of any of the foregoing embodiments includes performing a welding operation to secure an endwall at the free surface.

In a further embodiment of any of the foregoing embodiments, the baffle includes a non-working surface and the two datum features are in the non-working surface.

In a further embodiment of any of the foregoing embodiments, the baffle is elongated along a longitudinal direction, and the two datum features are spaced-apart in the longitudinal direction and in the same surface.

A gas turbine engine article according to an example of the present disclosure includes a baffle configured to be mounted in a cavity of a gas turbine engine component. The baffle has a baffle wall that circumscribes an open interior region. The baffle wall includes impingement orifices, and baffle wall defines two datum features, wherein at least one of the datum features is semi-spherical.

In a further embodiment of any of the foregoing embodiments, each of the datum features is semi-spherical.

In a further embodiment of any of the foregoing embodiments, the baffle includes a non-working surface and the two datum features are in the non-working surface.

In a further embodiment of any of the foregoing embodiments, the baffle is elongated along a longitudinal direction, and the two datum features are spaced-apart in the longitudinal direction and in the same surface.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
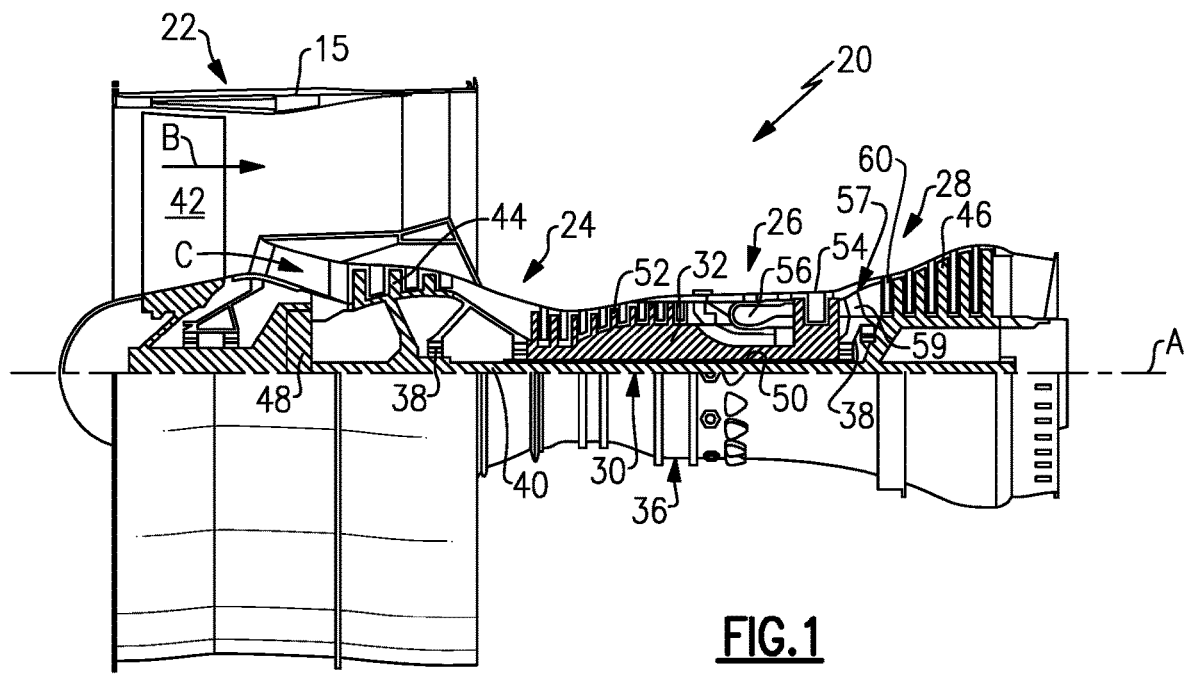
FIG. 1 illustrates a gas turbine engine.

FIG. 1 schematically illustrates a gas turbine engine 20. The gas turbine engine 20 disclosed is a two-spool turbofan that generally incorporates a fan section 22, a compressor section 24, a combustor section 26 and a turbine section 28. The fan section 22 drives air along a bypass duct B defined within a nacelle or case 15, and also drives air along a core flow path C for compression and communication into the combustor section 26 then expansion through the turbine section 28. Although depicted as a two-spool turbofan gas turbine engine in the disclosed non-limiting embodiment, the examples described herein are not limited to use with two-spool turbofans and the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is characterized by a pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
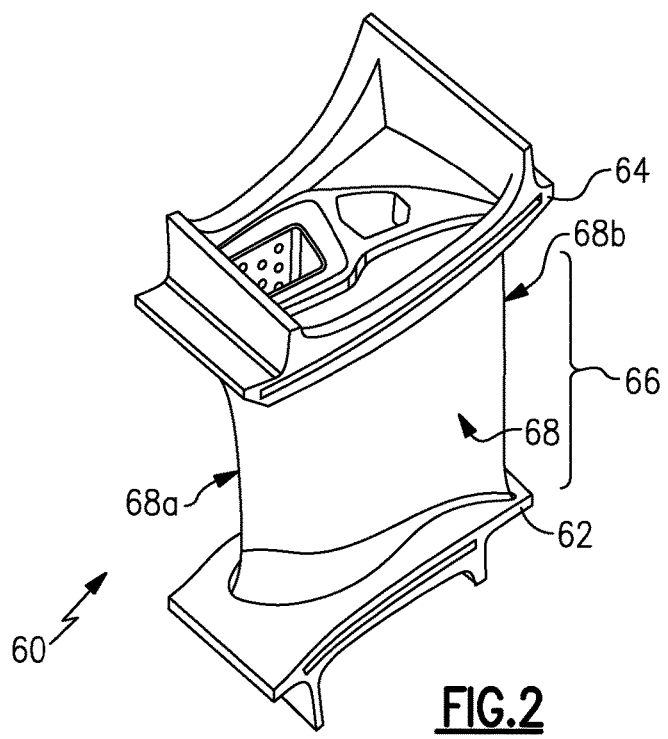
FIG. 2 illustrates an airfoil of the gas turbine engine.
Figure 3:
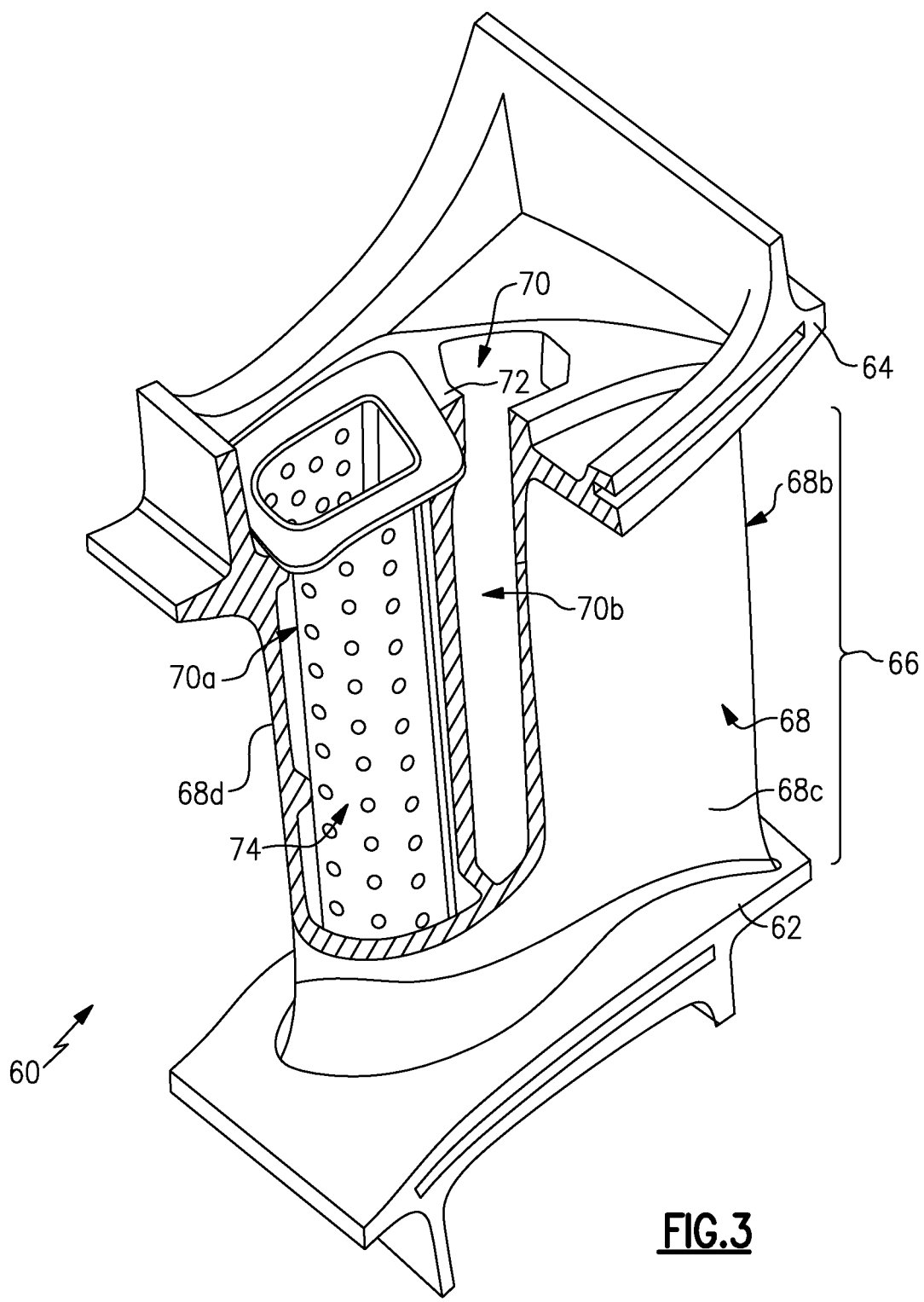
FIG. 3 illustrates a partially cutaway view of the airfoil of FIG. 2.

FIG. 2 illustrates a representative example of a gas turbine engine component, namely a turbine airfoil 60 used in the turbine engine 20 (see also FIG. 1). FIG. 3 illustrates a partial cutaway view of the airfoil 60. As shown, the turbine airfoil 60 is a turbine vane.

The turbine airfoil 60 includes an inner platform 62, an outer platform 64, and an airfoil section 66 that spans between the inner and outer platforms 62/64. The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. In this example, the first side 68c is a pressure side and the second side 68d is a suction side. The outer wall 68 circumscribes an internal core cavity 70, which in this example is partitioned by a rib 72 into a forward core cavity 70a and an aft core cavity 70b. As will be appreciated, there may alternatively be only a single core cavity or there may be additional ribs to partition additional core cavities.

There is a baffle 74 (i.e., gas turbine engine article) disposed in the forward core cavity 70a. It is to be appreciated, however, that the examples herein are not location-limited and may be applied to baffles in aft core cavities, intermediate core cavities, or single core cavities.

Figure 4:
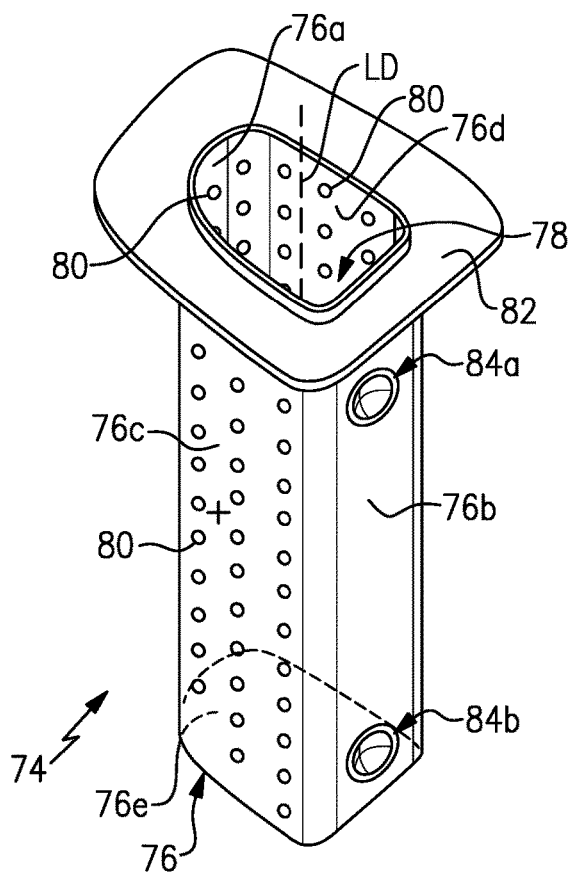
FIG. 4 illustrates an isolated view of a baffle of the airfoil of FIGS. 2 and 3.

FIG. 4 illustrates an isolated view of the baffle 74. The baffle 74 is formed of a baffle wall, which is generally designated at 76. For instance, the baffle wall 76 is formed of a metallic alloy, such as a nickel- or cobalt-based superalloy. The baffle wall 76 circumscribes an open interior region 78 and includes a forward wall 76a, an aft wall 76b, and lateral or side walls 76c/76d. The baffle 74 may also include an endwall 76e at one end (near the first platform 62), while the opposite (near the second platform 64) may be open to receive cooling air. The forward wall 76a and the lateral walls 76c/76d include impingement orifices 80. The aft wall 76b is a non-working surface or wall and thus contains no orifices. In the illustrated example, the baffle 74 also includes a flange 82, which is welded or otherwise bonded to the platform 64 to affix the baffle 74 in the cavity 70a.

In general, the baffle 74 is formed by three pieces that are welded together. The forward wall 76a, aft wall 76b, and lateral or side walls 76c/76d are formed of a single, monolithic piece of superalloy, the endwall 76e is formed of a single monolithic piece of superalloy, and the flange 82 is formed of a single monolithic piece of superalloy. Alternatively, one or more of the forward wall 76a, aft wall 76b, lateral or side walls 76c/76d, endwall 76e, and the flange 82 may be formed of multiple pieces that are welded together. As an example, rather than being one monolithic piece, the structure containing the forward wall 76a, aft wall 76b, and lateral or side walls 76c/76d may be formed of two halves or two or more sections that are welded together.

The shape of the baffle 74 follows the geometry of the forward core cavity 70a but is smaller than the cavity 70a so as to enable assembly/disassembly of the baffle 74 into/from the cavity 70a. The baffle 74 is in a fixed position in the cavity 70a. For instance, the baffle 74 can be welded or otherwise affixed with the first platform 62, the second platform 64, or both. In the fixed position, which is shown in FIG. 3, there is a gap surrounding the baffle 74. The gap provides a stand-off between the baffle 74 and the sides of the cavity 70a. For instance, the gap is substantially constant but may be varied to meet performance requirements.

During operation of the engine 20, cooling air, such as bleed air from the compressor section 24, is provided through the second platform 64 into the open interior region 78 of the baffle 74. The cooling air flows out from the open interior region 78 through the impingement orifices 80 and impinges on the leading end 68a and first and second sides 68c/68d to provide cooling. The cooling air then flows in the gap around the baffle 74 before being discharged into the core flow path through film cooling holes in the airfoil section 66.

There may be dimensional or geometric variations in a baffle that are introduced during fabrication. For example, a baffle may be formed in multiple steps that utilize, and depend on, reference points to perform registered forming operations (e.g. six axis operations). Initially in the forming, temporary reference points can be taken off of tooling used to perform a forming operation on the baffle. As features are formed in the baffle those features serve as reference points in subsequent forming operations instead of the temporary reference points.

The use of the temporary reference points is necessary in such fabrication processes because the subsequent reference points do not exist during earlier forming steps. The use of these temporary reference points, however, introduces dimensional error, which can compound over several forming operations. To some extent, the dimensional error may fall within tolerances that are accounted for in the baffle design, but baffles that vary outside of tolerances may require re-work or scrapping. For instance, for a three-piece, welded baffle, an initial tube is cut and then an endwall and flange are welded onto the respective cut ends of the tube. Impingement orifices are also drilled into the tube. Dimensional error may result in the cuts being made and/or the holes being drilled at off-design locations. In this regard, as will be described in further detail below, the baffle 74 includes two datum features 84a/84b that facilitate elimination of temporary reference points and establishing a fixed reference position of the baffle 74 during all steps of fabrication. It is to be understood that although the two datum features 84a/84b are described in the examples herein, that the baffle 74 may have one or more additional datum features that are substantially similar to or identical to the datum features 84a/84b.

At least one of the datum features 84a/84b is semi-spherical, but more typically both will be semi-spherical. As used herein, the term "semi-spherical" refers to a shape that is a portion of a sphere and may include half a sphere, or more or less than half a sphere. For instance, the datum features 84a/84b are semi-spherical dimples formed in the aft wall 76b, which is a non-working surface. In this example, the baffle 74 is generally elongated along a longitudinal direction, designated at central axis LD. The datum features 84a/84b are spaced-apart along the longitudinal direction.

One or both of the datum features 84a/84b can alternatively be located elsewhere on the wall 76 of the baffle 74, subject to several constraints. For instance, the datum features 84a/84b cannot be at locations that coincide with the locations where the orifices 80 are to be drilled, locations in which the dimple (or corresponding protrusion on the other side of the dimple) would interfere with seating of the baffle 74 in the cavity 70a, or locations at which the dimple (or corresponding protrusion on the other side of the dimple) would hinder insertion or removal or the baffle 74 from the cavity 70a. In these regards, the non-working surface provided by the aft wall 76b provides a good, but non-limiting, location for the datum features 84a/84b to facilitate avoidance of the above constraints.

Figure 5:
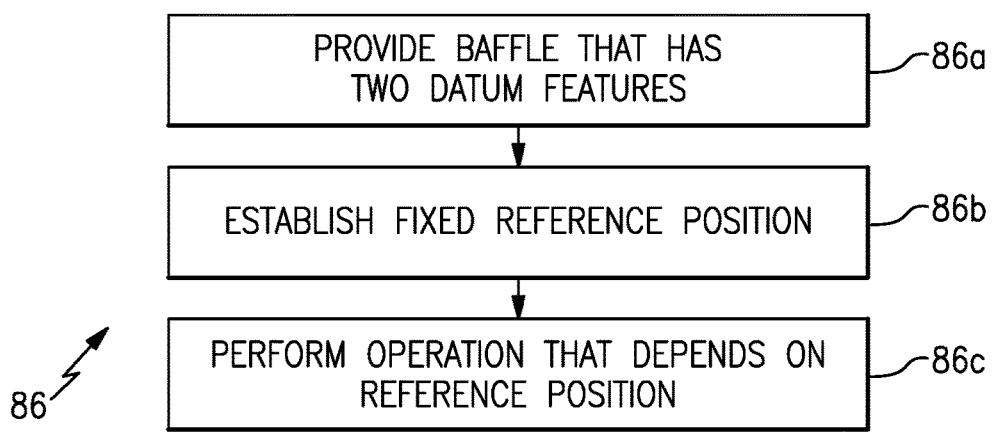
FIG. 5 illustrates a method of fabricating the baffle.

The datum features 84a/84b are further demonstrated in an example method 86 of fabricating the baffle 74, depicted in FIG. 5. The method 86 includes steps 86a, 86b, and 86c. Initially, at step 86a, the baffle 74 is provided which has the datum features 84a/84b. At this initial step, the baffle 74 has not yet undergone forming steps to create the orifices 80 or ends of the baffle 74, or operations to attach the flange 82 and endwall 76c. That is, the baffle 74 is initially substantially unformed and may be, for example, a relatively simple tube that defines the datum features 84a/84b in the wall that will be the aft wall 76b. Such a tube with the datum features 84a/84b can be provided as a pre-fabricated starting workpiece. Alternatively, the tube with the datum features 84a/84b can be provided by forming the tube with the datum features 84a/84b. For example, the tube can be formed in a tool from a tube blank that is then expanded outwards against the tool by application of an internal pressure. The tool contains semi-spherical protrusions such that when the tube expands against the tool wall the tube conforms to the protrusions to form the semi-spherical dimples that serve as the datum features 84a/84b.

Figure 6:
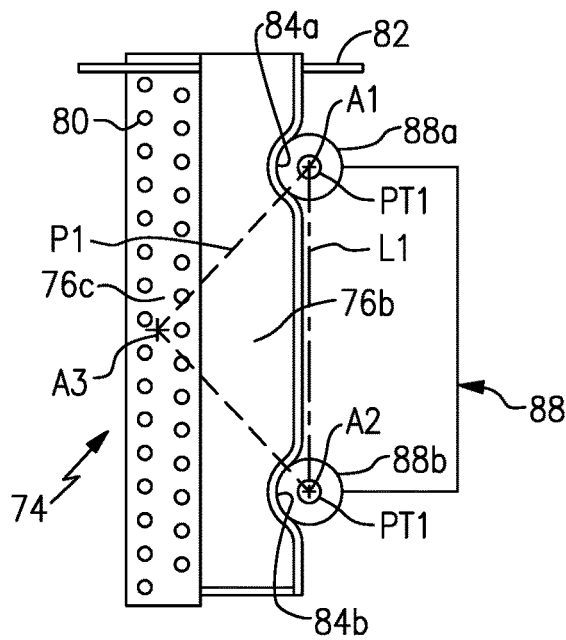
FIG. 6 illustrates the baffle nested in a fixture.

Next, at step 86b, the datum features 84a/84b are used to establish a fixed reference position of the tube or baffle 74 in a fixture. For example, as shown in FIG. 6, such a fixed reference position is established by engaging the two datum features 84a/84b with two corresponding locators 88a/88b on the fixture 88. The locators 88a/88b are semi-spherical balls that match the semi-spherical shape (radius of curvature) of the datum features 84a/84b. The semi-spherical balls 88a/88b are received into the datum features 84a/84b and the tube or baffle 74 is then secured with the fixture 88, such as by clamping. Once secured, the tube or baffle 74 is in the fixed reference position, which will also be described in additional detail below.

Once in the fixed reference position, at least one operation is performed on the tube or baffle 74 at step 86c. For instance, the operation includes a forming operation. Example forming operations include those which result in a physical change to the geometry of the tube or baffle 74. Forming operations may include, but are not limited to, cutting operations, drilling operations, grinding operations, and additive operations.

Most typically, the forming operations will relate to an initial fabrication of the baffle 74, i.e., forming the baffle 74 from the raw tube that has the datum features 84a/84b. However, it is to be appreciated that the method 86, datum features 84a/84b, and operations are not limited to initial fabrication. For instance, after an initial fabrication, the datum features 84a/84b can be used to establish the same fixed reference position in order to perform repair operations. Such repair operations may involve cutting, grinding, or the like, and/or additive operations to replace portions of the baffle 74. It is to be further appreciated that the method 86, datum features 84a/84b, and operations are also not limited to forming operations. For instance, after an initial fabrication, the datum features 84a/84b can be used to establish the same fixed reference position in order to perform inspection operations. Such inspection operations may be performed prior to service in the engine 20 and/or after a period of operation in the engine 20, to verify dimensions compared to design, such as the location of the orifices 80, endwall 76e, or flange 82. In these regards, since the datum features 84a/84b are present initially, the datum features 84a/84b, and thus the same fixed reference position, can be used for all operations performed thereafter, which facilitates a reduction in the introduction of error that might otherwise occur from using different reference positions that are based on differing sets of reference points or temporary reference points.

The operation or operations are dependent upon the fixed reference position. The term "dependent" as used herein refers to a reliance on the fixed reference position to perform the operation at a correct or intended design location. For example, the orifices 80 are drilled at designated coordinates in a reference coordinate system in which the fixed reference position, and thus baffle 74, is situated. The accuracy of the actual drilled location as compared to the design location relies on the fixed reference position. To the extent that a reference position varies, due to use of temporary reference points or other factors, a drilled location may vary from the design location. Likewise, the accuracy of other operations described herein above depends on the fixed reference position to perform the given operation at a correct or intended design location.

The fixed reference position can be further understood in terms of nesting the tube or baffle 74 in the fixture 88. In this regard, the fixed reference position is a position in which the tube or baffle 74 is nested, or secured, such that it has no degree of freedom to move relative to a defined reference plane, reference line, and reference point. For instance, in the fixed reference position the tube or baffle 74 is fixed (i) in a reference plane that is defined by first and second datum points at the two datum features 84a/84b and a third datum point on the tube or baffle 74, (ii) on a reference line that is defined between the first and second datum points, and (iii) at a reference point that is defined by one of the first or second datum points. In the example shown in FIG. 6, the first, second, and third datum points are represented at A1, A2, and A3, respectively. The first and second datum points A1/A2 are the center-points of the semi-spherical ball locators 88a/88b. The reference plane is designated at P1, and the reference line is designated at L1. The reference point is designated at PT1, which coincides with datum point A1 and or A2. As will be appreciated, the coincidence of the reference point PT1 with either the datum points A1 or A2, as well as the use of datum points A1 and A2 to establish the line L1 and the plane P1, reduces the total number of reference points needed to establish the fixed reference position.

Figure 7:
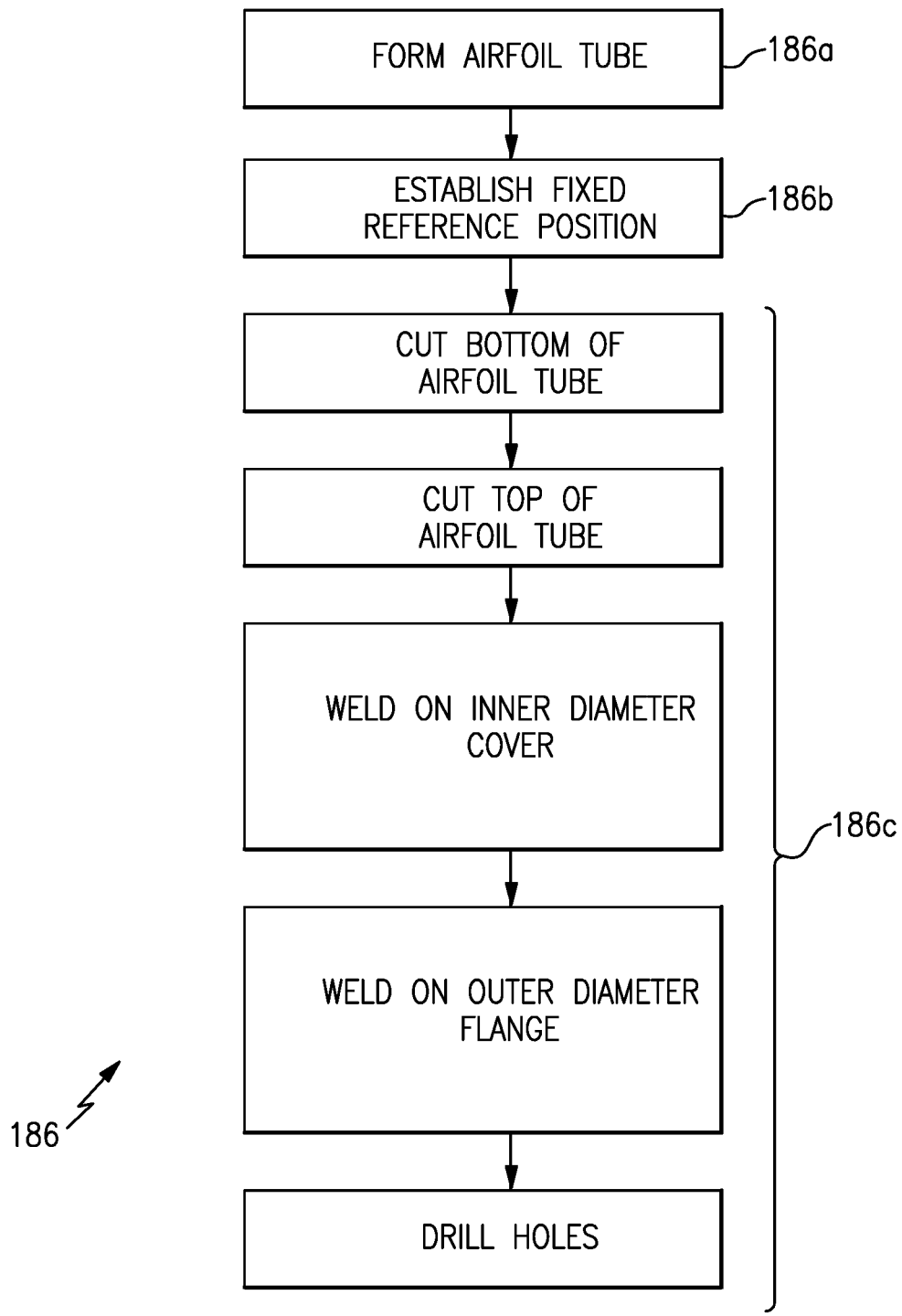
FIG. 7 illustrates another example method of fabricating a baffle.

FIG. 7 depicts a further example of a method 186. At step 186a the aforementioned tube is provided that has the datum features 84a/84b. In this example, the tube is provided by a forming process, such as the tube expansion described above. Alternatively, the tube is provided as a pre-fabricated workpiece that has the datum features 84a/84b. At step 186b the tube is nested in the fixture 88 in the fixed reference position by engaging the two datum features 84a/84b with the two corresponding locators 88a/88b on the fixture 88, as described above with reference to FIG. 6. In the fixed reference position the tube is fixed in the reference plane P1, reference line L1, and reference point PT1 discussed above. At 186c forming operations are performed on the tube. In this example, the operations include cutting operations, drilling operations, and welding operations. It is to be understood, however, that the type of operations may depend on the design of the baffle 74.

As an example, the cutting operation is performed at a location on the tube that is dependent upon the fixed reference position, to remove the ends of the tube and create free surfaces where the cuts were performed. After the cutting, welding operations are performed to attach the cover or endwall 76e and flange 82 on the respective free ends created by the cutting. Drilling operations are performed at multiple locations on the tube that are also dependent on the fixed reference position. For instance, the drilling operation creates the impingement orifices 80. As will be appreciated, the drilling may be performed either before or after the cutting. The datum features 84a/84b are present for each of the cutting, welding, and drilling operations and, therefore, each operation utilizes the same fixed reference position. The use of the same reference position facilitates the reduction of dimensional error by avoiding the use of temporary reference points in establishing a fixed reference position or using multiple fixed reference positions that are based on differing sets of reference points.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of fabricating a baffle for a gas turbine engine component, the method comprising:
providing a baffle that has a baffle wall that initially is a tube that circumscribes an open interior region, the baffle wall defining first and second datum features, wherein the first datum feature is a semi-spherical dimple that protrudes into the open interior region, the tube has a forward wall, an aft wall, and lateral side walls, the first and second datum features are on the aft wall, the forward wall is curved, and the aft wall is planar;
establishing a fixed reference position of the baffle in a fixture by engaging the two datum features with two corresponding locators on the fixture; and
performing at least one operation on the baffle that is dependent upon the reference position.

2. The method as recited in claim 1, wherein the second datum feature is also a semi-spherical dimple that protrudes into the open interior region.

3. The method as recited in claim 1, wherein the at least one operation includes a forming operation.

4. The method as recited in claim 1, wherein the at least one operation includes an inspection operation.

5. The method as recited in claim 1, wherein the at least one operation includes a cutting operation.

6. The method as recited in claim 1, wherein the at least one operation includes a drilling operation.

7. The method as recited in claim 1, wherein the baffle includes a non-working surface and the first and second datum features are in the non-working surface.

8. The method as recited in claim 1, wherein the baffle is elongated along a longitudinal direction, and the first and second datum features are spaced-apart in the longitudinal direction and in the same surface.

9. A method of fabricating a baffle for a gas turbine engine component, the method comprising:
providing a baffle that initially is a tube that has first and second datum features that are semi-spherical dimples that protrude into an interior region of the tube, the tube has a forward wall, an aft wall, and lateral side walls, the first and second datum features are on the aft wall, the forward wall is curved, and the aft wall is planar;
nesting the tube in a fixed reference position in a fixture by engaging the first and second datum features with two corresponding locators on the fixture such that in the fixed reference position the tube is fixed (i) in a reference plane that is defined by first and second datum points at the first and second datum features and a third datum point on the tube, (ii) on a reference line that is defined between the first and second datum points, and (iii) at a reference point that is defined by one of the first or second datum points;
performing a cutting operation at a location on the tube that is dependent upon the fixed reference position, the cutting operation removing an end of the tube and creating a free surface; and
performing a drilling operation at multiple locations on the tube that are dependent on the fixed reference position, the drilling operation creating a plurality of impingement orifices.

10. The method as recited in claim 9, further comprising performing a welding operation to secure an endwall at the free surface.

11. The method as recited in claim 9, wherein the baffle includes a non-working surface and the first and second datum features are in the non-working surface.

12. The method as recited in claim 9, wherein the baffle is elongated along a longitudinal direction, and the first and second datum features are spaced-apart in the longitudinal direction and in the same surface.

13. The method as recited in claim 9, wherein, except for the first and second datum features and the first, second, and third datum points, the tube has no additional datum features or datum points.

14. The method as recited in claim 9, wherein, prior to the nesting, the tube has no protrusions or dimples except for the first and second datum features.

15. A method of fabricating a baffle for a gas turbine engine component, the method comprising:
providing a baffle that initially is a tube that has first and second datum features that are semi-spherical dimples that protrude into an interior region of the tube, wherein the providing includes forming the tube from a tube blank by expanding the tube blank outwards against a tool wall by application of an internal pressure, the tool wall containing semi-spherical protrusions such that when the tube expands against the tool wall the tube conforms to the protrusions to form the semi-spherical dimples
nesting the tube in a fixed reference position in a fixture by engaging the first and second datum features with two corresponding locators on the fixture such that in the fixed reference position the tube is fixed (i) in a reference plane that is defined by first and second datum points at the first and second datum features and a third datum point on the tube, (ii) on a reference line that is defined between the first and second datum points, and (iii) at a reference point that is defined by one of the first or second datum points;
performing a cutting operation at a location on the tube that is dependent upon the fixed reference position, the cutting operation removing an end of the tube and creating a free surface; and
performing a drilling operation at multiple locations on the tube that are dependent on the fixed reference position, the drilling operation creating a plurality of impingement orifices.

\* \* \* \* \*